July 9, 1940.  R. B. HOLLOPETER  2,207,319
BAIT HOLDER
Filed April 7, 1939
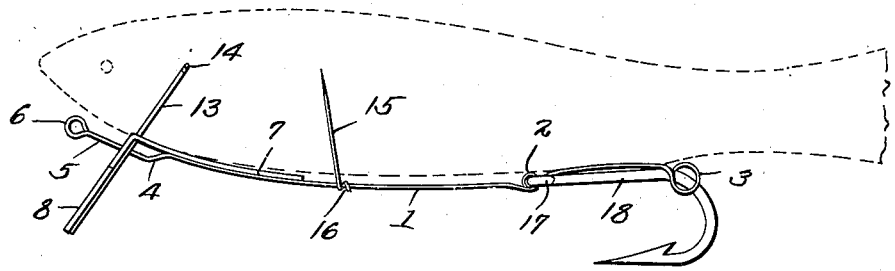
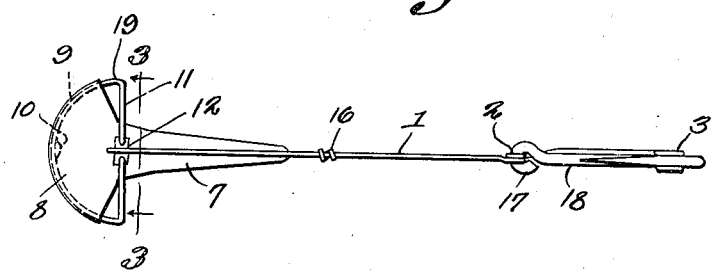
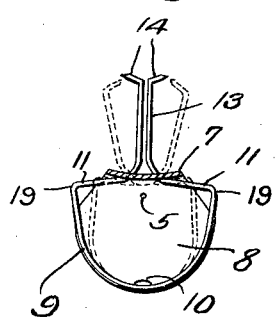 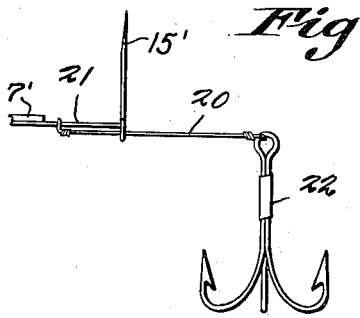
R. B. Hollopeter
INVENTOR.
BY *C. A. Snow & Co.*
ATTORNEYS.

Patented July 9, 1940

2,207,319

UNITED STATES PATENT OFFICE 2,207,319

BAIT HOLDER

Raymond Bellmont Hollopeter, Olympia, Wash.

Application April 7, 1939, Serial No. 266,661

4 Claims. (Cl. 43—40)

This invention relates to a bait holder and is designed primarily for holding any kind of fresh or pickled small fish used as bait.

An object of the invention is to provide a holder to which a small fish can be attached readily, the construction being such as to hold the mouth of the fish closed and to maintain the fish in an upright position with the hook or hooks beneath it and with the tail of the bait free so that it can swing laterally.

A further object is to provide a holder which can be used with bait of different sizes and which will work equally well in trolling and casting.

It is also an object to provide a holder which can be reshaped, as desired, so as to cause the bait to have either a natural swimming action or an erratic motion, as preferred.

A still further object is to provide a holder to which the bait can be attached readily without the necessity of removing gloves or mittens from the hands of the user, this being a decided advantage when fishing in cold weather.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is a side elevation of the bait holder, a small fish serving as bait being indicated by broken lines in position thereon.

Figure 2 is a bottom plan view of the bait holder.

Figure 3 is a section on line 3—3, Figure 2, the positions of the gripping fingers while in use being indicated by broken lines.

Figure 4 is an elevation of the rear portion of the bait holder showing a modified means for attaching a hook.

Referring to the figures by characters of reference, 1 designates a shank in the form of a stiff wire bent at an intermediate point to provide an eye in the form of a coil 2 while the rear end of this shank is formed into a gripping coil 3 made up of not less than two convolutions. The forward end of shank 1 is offset as at 4 to provide an arm 5 having a terminal eye 6 to which a line, not shown, is to be attached.

Mounted on and soldered or otherwise joined to shank 1 adjacent to the forward end thereof is a plate 7 which is concavo-convex in transverse section and gradually increases in width toward its forward end where it merges into a downwardly and forwardly inclined deflecting blade 8. To the back surface of this blade is connected the middle portion of an arcuate spring 9, the point of connection being indicated at 10 and this connection being effected by means of solder or the like. The upper ends of the spring project beyond the top of blade 8 at the sides thereof and there merge into inwardly extending arms 11 which project under plate 7 to a transverse slot 12 formed within the plate. Fingers 13 extend upwardly through the slot and are extensions of the arms 11. These fingers are normally side by side, as shown particularly in Figure 3 and are provided at their upper ends with oppositely extending prongs 14.

A pin 15 is secured to stem 1 by brazing or soldering, as indicated at 16, this pin being located between plate 7 and coil 2 and being extended upwardly from the stem.

The eye 17 of a fish hook 18 is movably seated in the coil 2 and the stem of this hook is adapted normally to be seated between and clamped by the convolutions of the terminal coil 3 as shown. Thus the hook is normally supported under the rear portion of the stem 1.

In using this holder the projecting angles or finger pieces 13 formed by the exposed merging portions of spring 9 and arms 11 are pressed toward each other. This will cause the upwardly extending fingers 13 to move past each other in opposite directions from the full line positions in Fig. 3 to the positions indicated by broken lines in said figure. The small fish to be used as bait is then empaled on the pin 15 and the head portion is inserted between these spread-apart fingers 13. The fingers are then released so that the prongs 14 will enter opposed parts of the head and tightly grip the same, thereby serving not only to hold the fish in an upright position but also to keep its mouth closed. The tail of the fish is left free so that it can swing from side to side.

Attention is directed to the fact that arm 5 is extended through blade 8 so as thus to be supported thereby.

When the bait is swallowed by a fish, the force of the strike will be such as to pull the hook out of engagement with the clamping or gripping coil 3. Thus the hook, in cooperation with the pin 15 and other parts of the holder prevents the bait from being disgorged.

In Figures 1 and 2 a single hook has been shown attached to the holder in a particular way. It is to be understood, however, that hooks could be attached in other ways. For example, and as shown in Figure 4, a wire 20 can be slidably mounted at one end on the stem 21 of the holder, this stem corresponding to stem 1 in Fig. 1 and carrying a plate 7' a portion of which is shown and which corresponds with the plate 7 in Fig. 2. This wire in turn will carry the hook which can be of any desired type. In the form shown in Figure 4 a triple hook 22 is connected to the wire 20. In this form also there is provided on the end of stem 21, an upstanding pin 15' corresponding with the pin 15 in Fig. 1, for holding bait.

It is to be understood of course that the bait holder can be made of any suitable materials, whether they be of metal, plastic, or both.

What is claimed is:

1. A bait holder including a stem, a deflecting blade connected to one end portion of the stem, means for connecting a hook to the other end portion thereof, an empaling pin projecting from the stem between said means and the blade, and means carried by the blade for gripping one end portion of bait empaled on the pin, said means including a spring, arms carried by the end portions of the spring and projecting above the blade, and prongs extending in opposite directions from the respective arms, said spring being compressible to move the arms apart into position to receive the bait between them and the prongs.

2. A bait holder including a stem, a deflecting blade at one end thereof, an empaling pin extending from the stem, means for connecting a hook to the stem, and a spring bait clamp connected to the back of and extending upwardly from the blade.

3. A bait holder including a stem, a deflecting blade at one end thereof, an empaling pin extending from the stem, means for connecting a hook to the stem, and a spring bait clamp connected to the back of and extending upwardly from the blade, said clamp including a spring rod bent to provide an arcuate portion having arms extended toward each other, fingers projecting from the arms above the blade, and terminal prongs projecting in opposite directions respectively, said arms having portions normally exposed beyond the sides of the blade for actuation to move the fingers apart to receive bait therebetween.

4. A bait holder including a stem, a deflecting blade at one end thereof, a bait empaling pin projecting from the stem, a bait clamp carried by and extending upwardly from the blade, a hook pivotally connected to the stem back of the pin, and a clamp for holding the hook normally elevated relative to the stem, said hook being releasable from the clamp when subjected to an impact.

RAYMOND BELLMONT HOLLOPETER.